United States Patent
Simpson

[19]

[11] Patent Number: 6,021,244
[45] Date of Patent: Feb. 1, 2000

[54] FIBER OPTIC STITCHING PROCESS AND APPARATUS

[75] Inventor: Ronald O. Simpson, Charlotte, N.C.

[73] Assignee: Roberts Systems, Inc., Charlotte, N.C.

[21] Appl. No.: 08/951,716

[22] Filed: Oct. 16, 1997

Related U.S. Application Data

[60] Provisional application No. 60/035,795, Jan. 10, 1997.

[51] Int. Cl.$^7$ ...................................................... G02B 6/04
[52] U.S. Cl. ........................... 385/115; 385/147; 359/900
[58] Field of Search ............................. 83/485, 487, 488, 83/676, 950; 359/900; 385/115, 116, 121, 901, 147; 362/554, 559

[56] References Cited

U.S. PATENT DOCUMENTS

| | | | |
|---|---|---|---|
| 4,417,412 | 11/1983 | Sansom | 40/547 |
| 4,506,818 | 3/1985 | Ritter et al. | 227/67 |
| 5,084,993 | 2/1992 | Dahlheimer | 40/547 |
| 5,231,689 | 7/1993 | Reidinger | 385/147 |
| 5,291,378 | 3/1994 | Stone | 362/32 |
| 5,588,235 | 12/1996 | Juchymenko et al. | 40/547 |
| 5,836,225 | 11/1998 | Molnar et al. | 83/100 |
| 5,881,206 | 3/1999 | Schwar et al. | 385/147 |

*Primary Examiner*—Hung N. Ngo
*Attorney, Agent, or Firm*—Nexsen Pruet Jacobs & Pollard, LLP

[57] ABSTRACT

An apparatus for assembling fiber optic strands into sign components comprising a dispenser in continuous communication with a supply of fiber optic strand; a first positioner for moving the dispenser to a dispensing position adapted to be opposite a receiving aperture of a housing; engaging means in communication with the fiber optic strand for inserting a first end of the fiber optic strand through the dispenser and into one of the preselected housing apertures; a cutting apparatus for cutting the fiber optic strand at a predetermined location, thereby providing a first calculated length of a cut strand having a first end insertable into one of said housing apertures and a second cut end; a manipulator for grasping the second cut end of the cut strand; a second positioner for moving the manipulator to a predetermined position opposite a signage display panel; and an inserter, carried by the manipulator, for directing the second cut end of the cut strand a prescribed depth into the signage display panel.

20 Claims, 12 Drawing Sheets

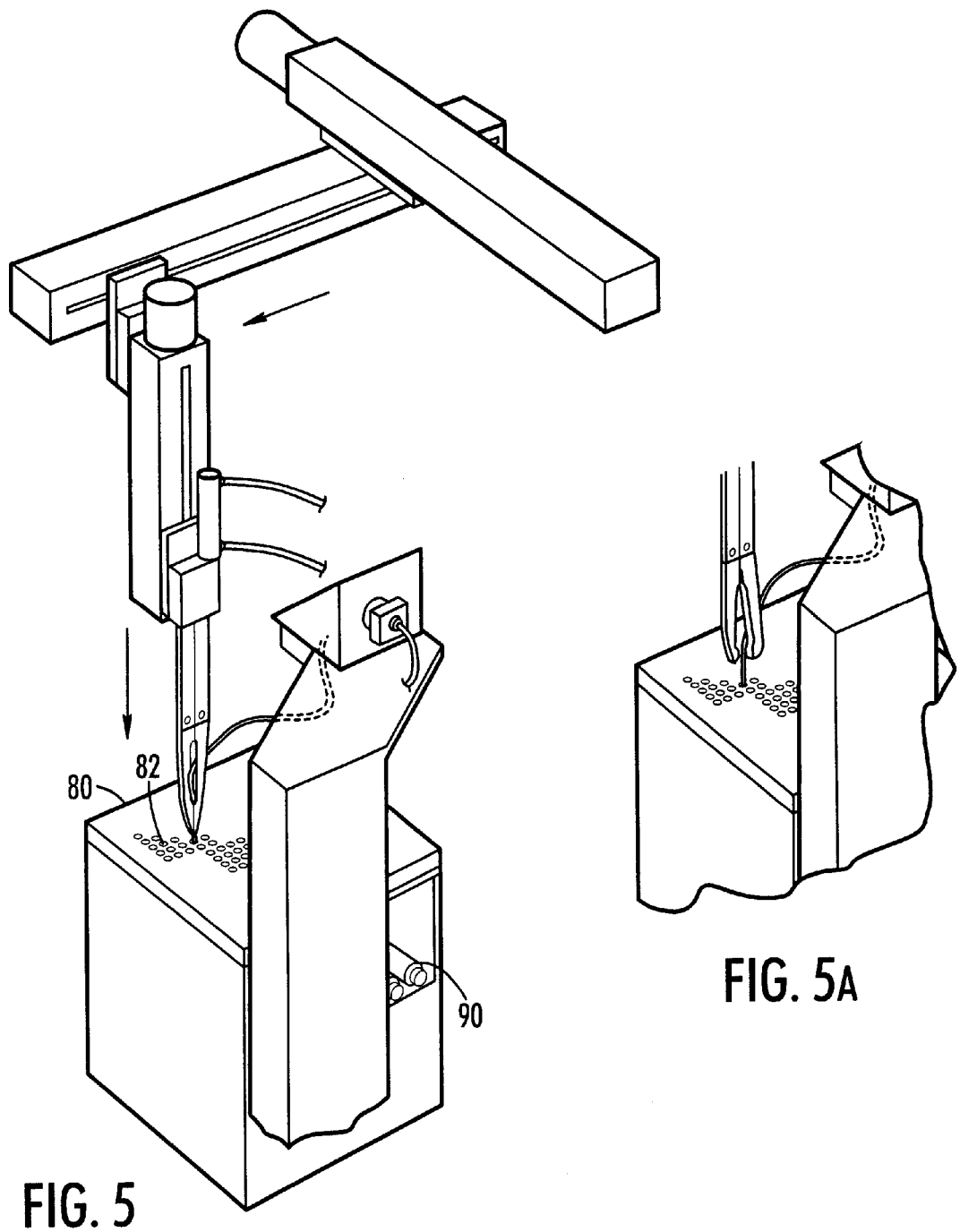

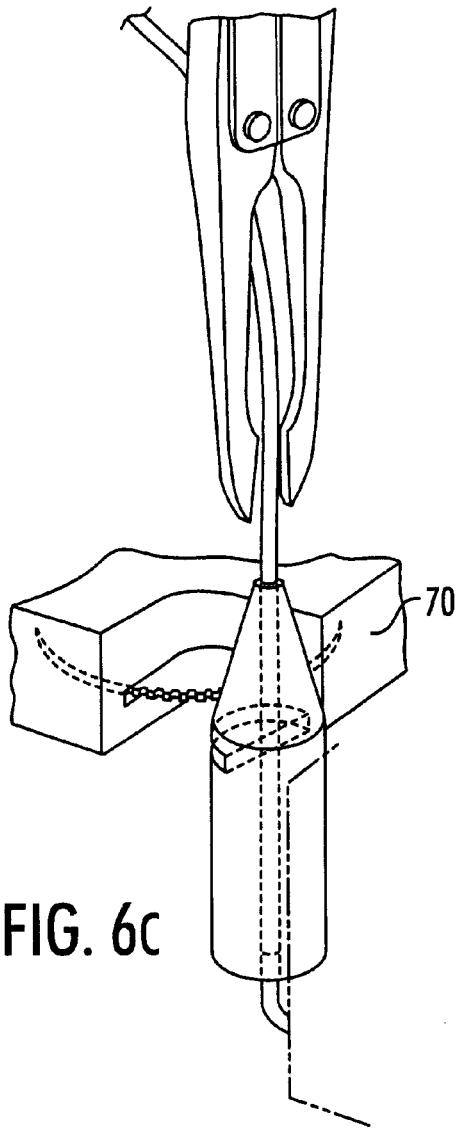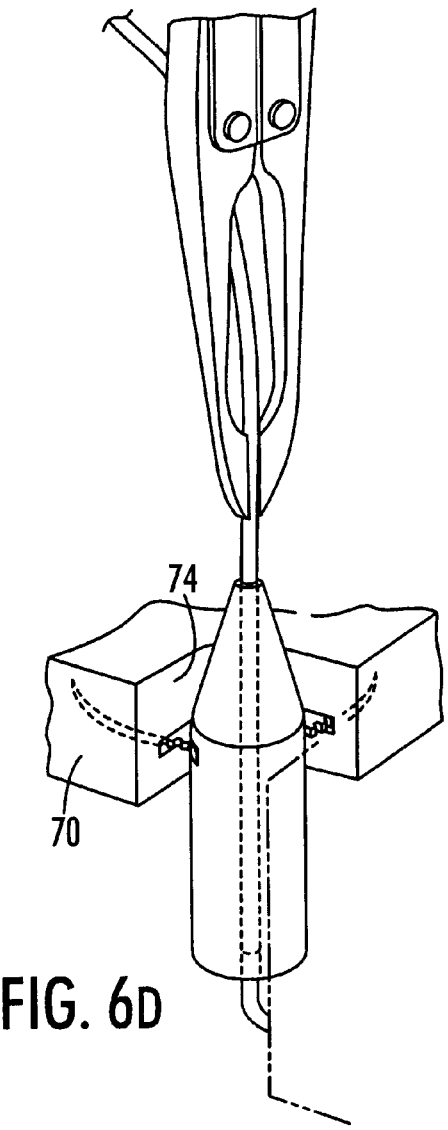

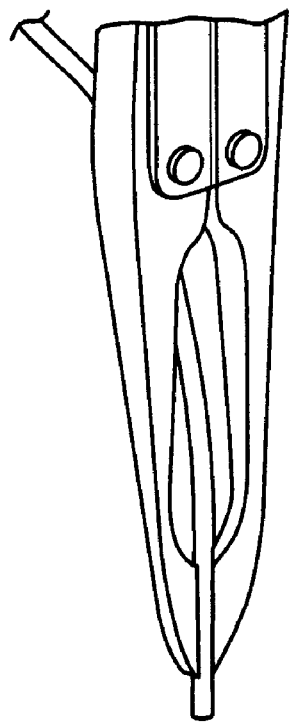
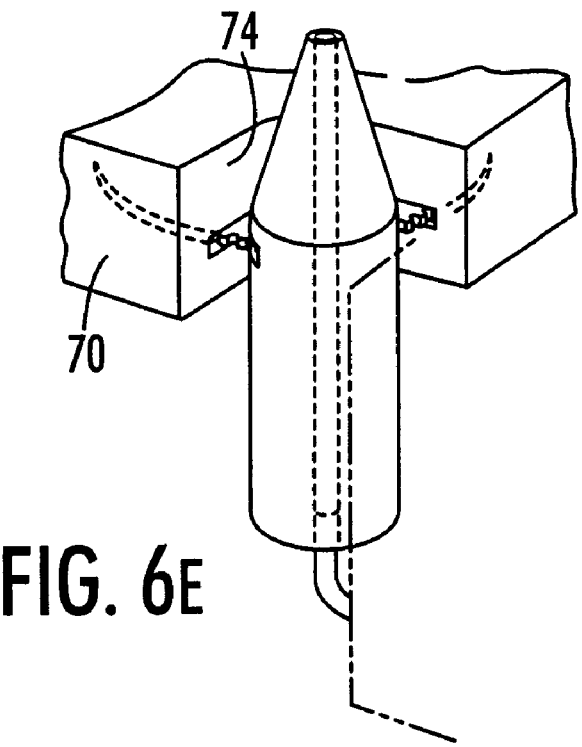
FIG. 6E

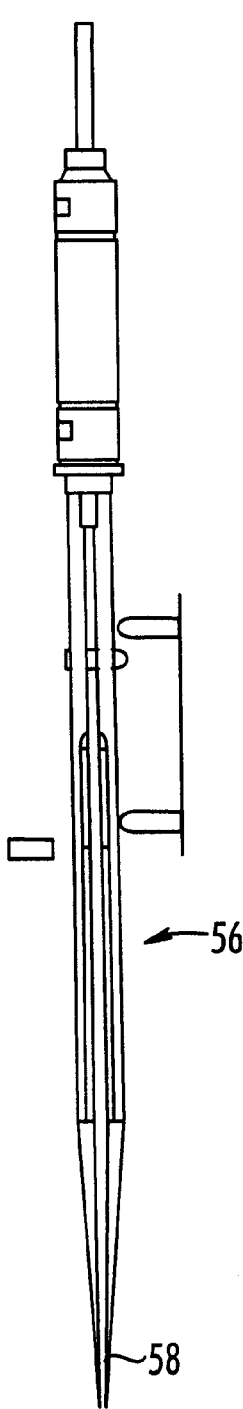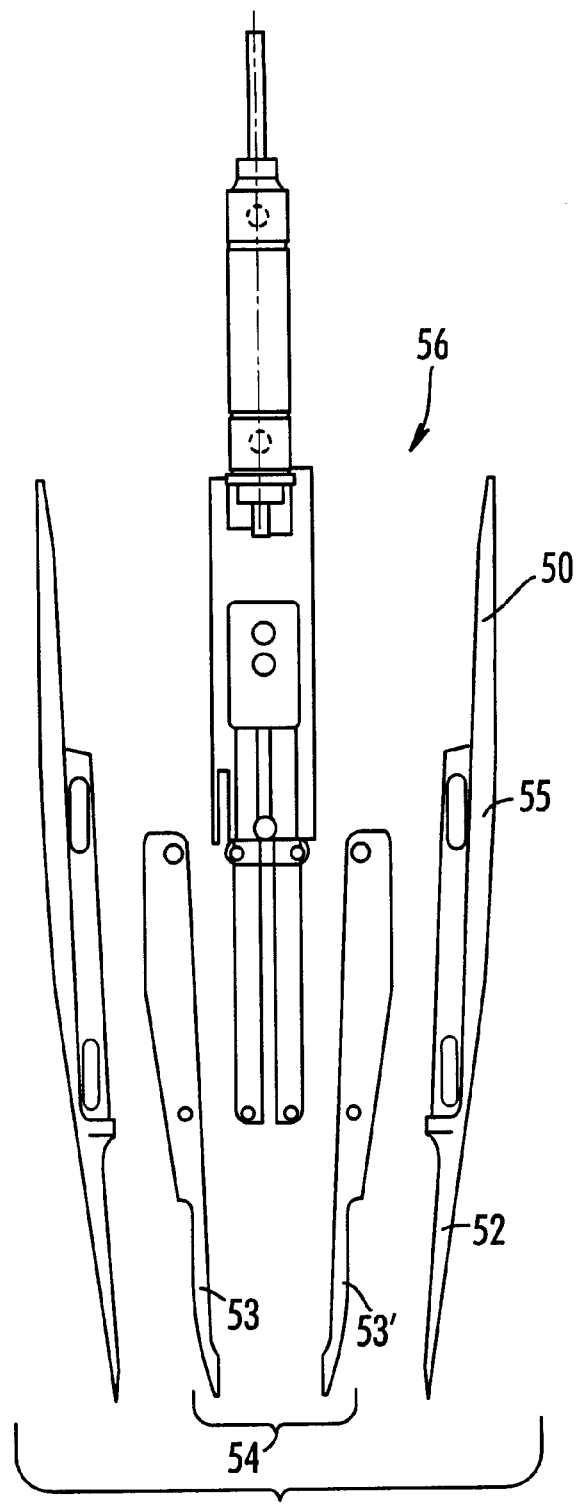
FIG. 8
FIG. 9

FIBER OPTIC STITCHING PROCESS AND APPARATUS

This application claims benefit of Provisional Appln. Ser. No. 60/035,795 filed Jan. 10, 1997.

BACKGROUND OF THE INVENTION

This invention relates generally to fiber optic lighted sign displays.

It is known in the art to make and use fiber optic signs. Such signs often make use of varying colors, sequences of lighting or background contrast to convey information. In U.S. Pat. Nos. 5,508,892, and 5,588,235, incorporated herein by reference, several fiber optic sign embodiments are described which make use of fiber optics to create visual patterns which simulate motion. Recent innovations in fiber optic signage capabilities, described in the above patents, permit complex and elaborate signage displays to be created.

As used herein, the terms "fiber" or "fiber optic" refer to flexible fiber optic strands and which may comprise either single strand or multiple strand construction. A sign constructed in accordance with the above referenced patents places the input and the output ends of the fiber optic strands in a predetermined spacial pattern. Heretofore, construction of a typical sized display sign having precisely placed and grouped bundles of fiber optic strands could exceed 8 hours of hand assembly of the fiber optic component. Accordingly, there is room for improvement and variation within the art making fiber optic signs.

SUMMARY OF THE INVENTION

It is an object of this invention to provide an automated process and an apparatus useful in the construction and assembly of a fiber optic sign.

It is a more particular object of this invention to provide an automated process for metering a fiber optic strand, dispensing a sufficient length of the fiber optic strand, placing a first end of the fiber optic strand adjacent a light source and at a predetermined location specified for the fiber strand, placing the second end of the fiber optic strand in a predetermined location of a display panel, and repeating the above steps with a new length of fiber optic strand.

It is a further and more particular object of this invention to provide an apparatus for the automated dispensing, placement, and insertion of fiber optic strands in a sign having an display panel and a light source.

It is yet a further and more particular object of this invention to provide a process and apparatus for the mechanized assembly and placement of fiber optic strands during the construction of a sign.

BRIEF DESCRIPTION OF THE DRAWINGS

FIGS. 3 through 5A provide an additional schematic view of the preferred apparatus seen in FIG. 1 showing an additional step in the process of positioning fiber optic strands for a sign.

FIGS. 6C through 6E illustrate additional steps of the manipulation of the fiber optic strand by the preferred embodiment of the invention.

FIG. 8 is a front elevation of the jaws of the gripper in a closed configuration.

FIG. 9 is an exploded view of the gripper seen in FIG. 8.

DETAILED DESCRIPTION

As best seen in reference to the accompanying figures, an apparatus 10 is provided which is used in a process of installing fiber optic strands in a signage display. As best described in reference to FIGS. 11 and 12 of U.S. Pat. No. 5,588,235, a fiber optic sign typically has flat display panel through which the output ends of a fiber optic strand project transmitted light. The input ends of the strand are placed in a predetermined location and pattern within a light input housing. Light from an illumination source is opposite the light input housing and is transmitted along the fiber length. A color wheel or similar color changing means is positioned between the light source and the light input. The color changing means has a plurality of discrete and varied colored filter zones for periodically changing the color of light from the light source. The filter zones define a preselected geometry which corresponds in width and geometric pattern to the placement of the fiber optic input ends carried by the light input housing.

Figure 1:
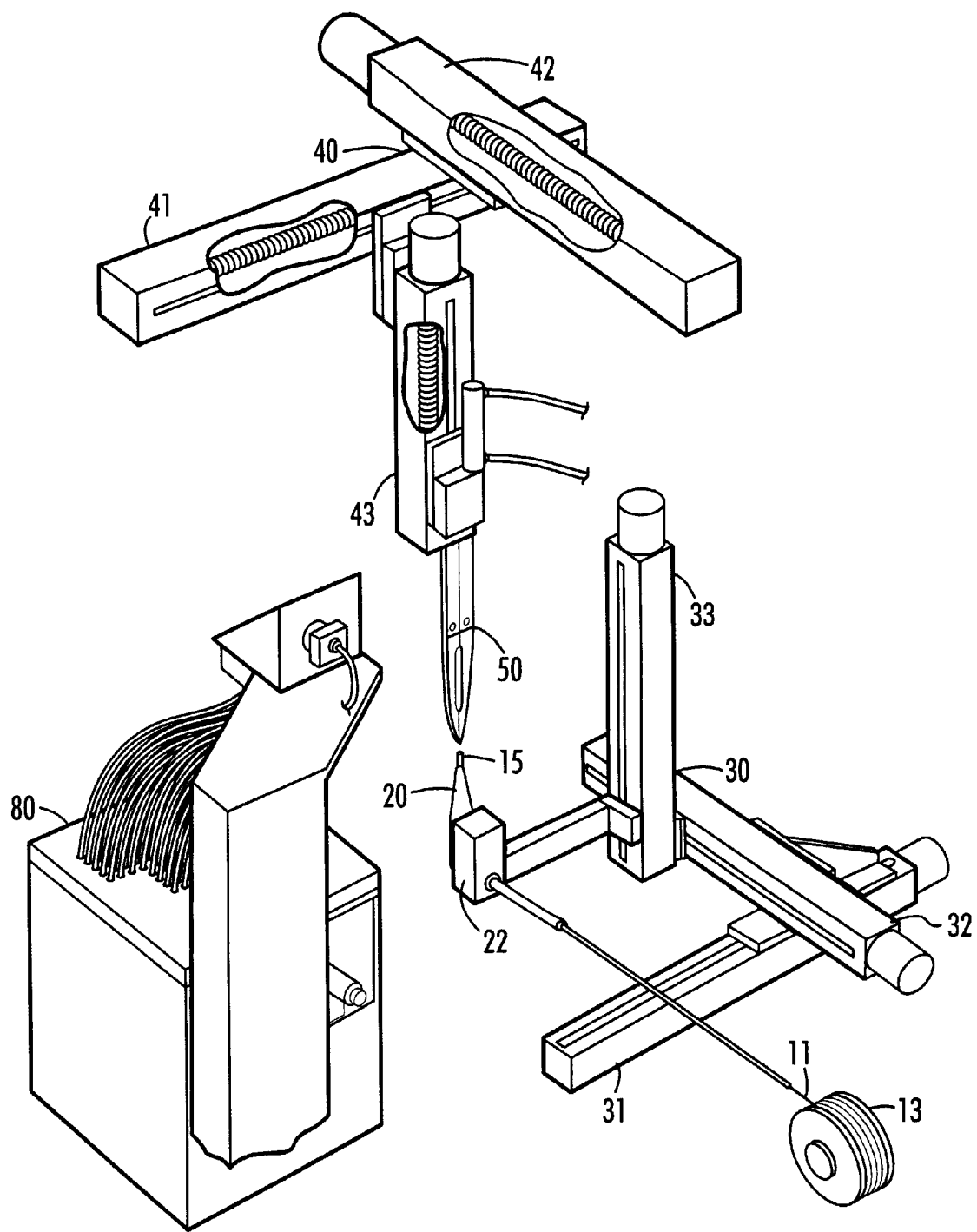
FIG. 1 is a schematic view of a preferred embodiment of an apparatus for assembling fiber optic strands into the respective input and output portions of a sign.
Figure 7:
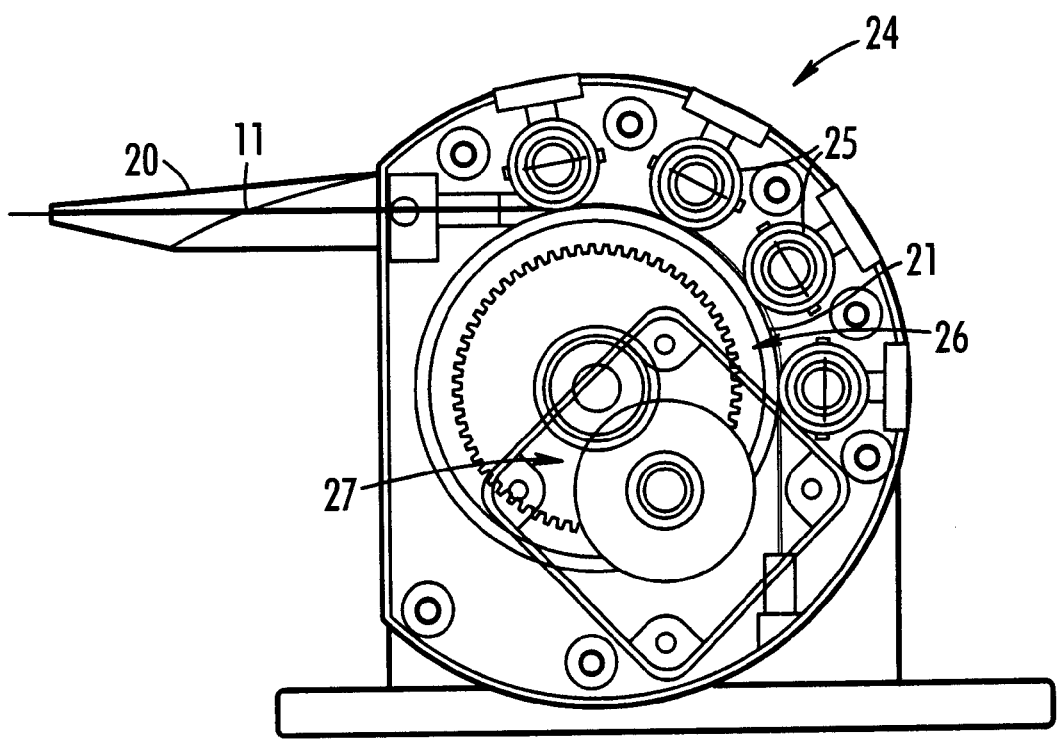
FIG. 7 illustrates the engaging means by which fiber optic strand is passed through the hollow needle.

As seen in reference to FIG. 1, an apparatus 10 has a source of fiber optic strand 11 as seen illustrated and carried on spool 13. Preferably, strand 11 is of plastic such as polymethyl methacrylate, although other fiber materials such as glass would suffice. The strands ideally have a coating or other treatment to maximize light transmission through the fiber strand. As seen in reference to FIG. 7, the strand is fed by engaging means 24 comprising a plurality of tensioned rollers 25 engaging the edge portion of the fiber optic strand 11 within a groove portion 21 of a grooved-roller 26 larger in diameter than tensioned rollers 25. Each roller 25 shares a common drive means 27 directing the fiber optic strand 11 through a dispenser which is a hollow needle 20. However, a variety of dispensers could be provided which meet the requirements of dispensing the stand in a non-damaging manner and doing so with sufficient force that the end of the strand is inserted into a narrow aperture of an input housing as described below.

Figure 2:
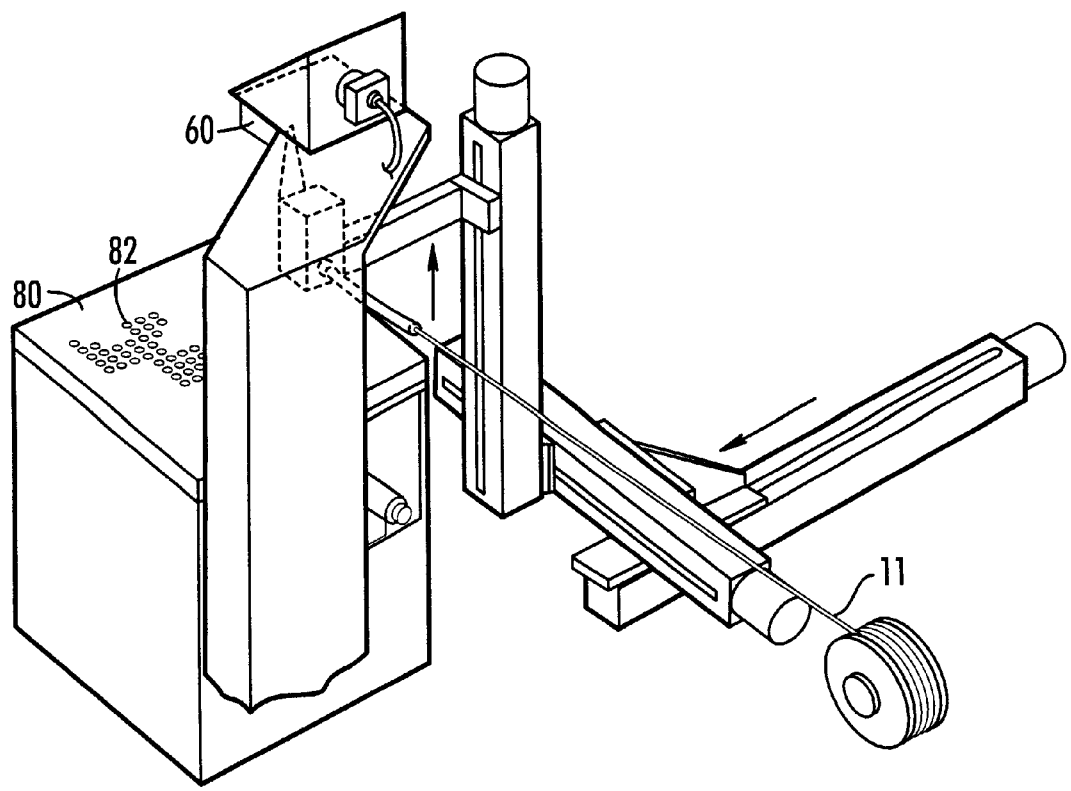
FIG. 2 is a schematic view of a selective portion of the apparatus seen in FIG. 1 showing the insertion of an input end of a fiber optic into a template opposite a light source.

As seen in FIG. 1, an encoder 22 adjacent needle 20 helps regulate and measure the length of fiber optic strand which is selectively fed to and through the needle. Needle 20 is carried by positioning means seen as actuator 30. Actuator 30 has motor-driven worm gear mechanisms 31, 32, and 33 which provide for the positioning of needle 20 along a respective X, Y and Z axis as defined in relation to a horizontal work plane. As seen in reference to FIG. 2, actuator 30 places needle 20 below an input housing 60. Although not shown, mechanism 31 is preferably mounted to a horizontal support of a work station.

A similar actuator 40 having worm gear drive mechanism 41, 42, and 43 for respective X, Y, and Z positioning may be used to position manipulator 56 which comprises a gripper 50. Actuator 40 places gripper 50 above a panel board 80 as seen in reference to FIG. 5. It is understood that the drawings, schematic in nature, are not to scale and that the length of the various drive mechanisms can be varied for the intended application, or that other positioning means may be used to position gripper 50 and needle 20.

Figure 6A:
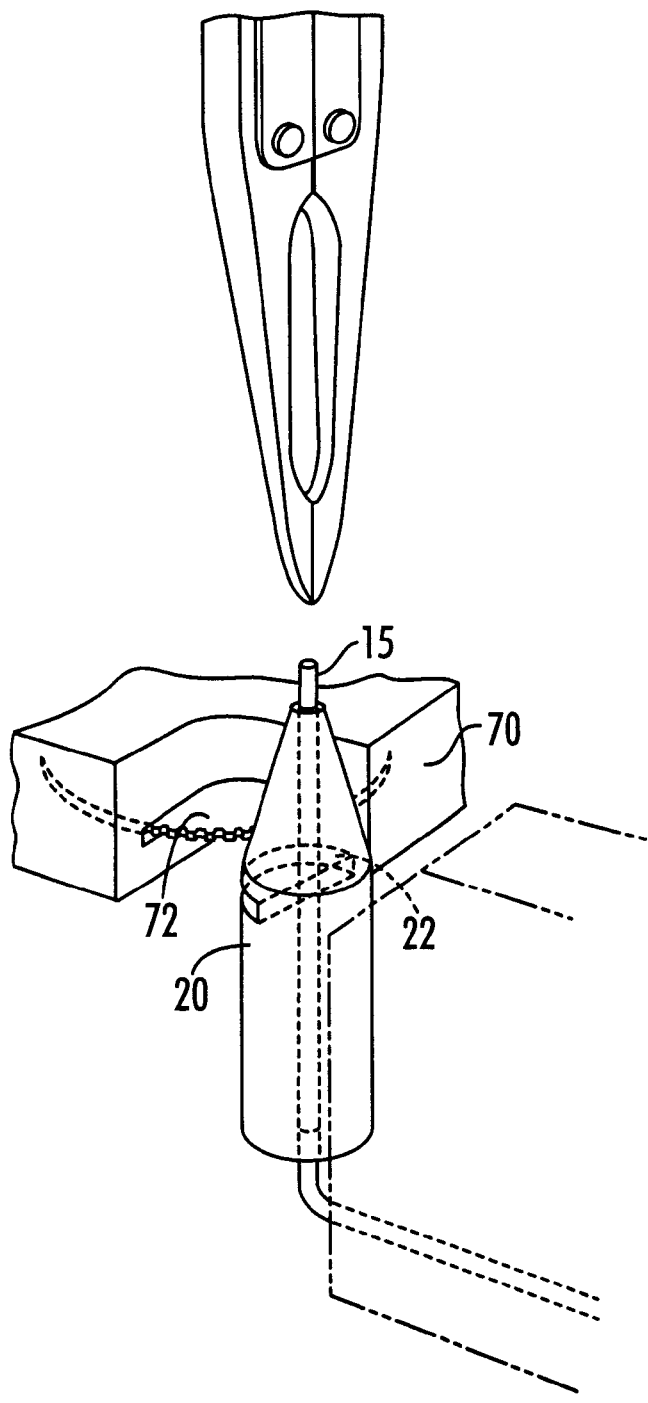
FIG. 6A is a perspective view in partial section of a guide handle showing additional features of the fiber optic cutting assembly.
Figure 6B:
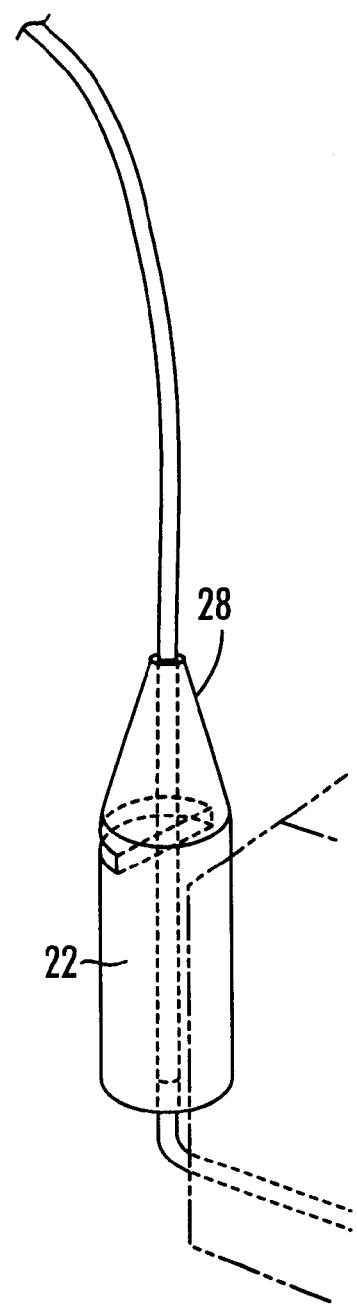
FIG. 6B is a schematic view illustrating the passage of the fiber optic strand through the hollow needle.

As seen in FIGS. 1 and 6A, a first end 15 of strand 11 protrudes slightly beyond the tip of needle 20. The first end is also described as an input end. When needle 20 is positioned below input housing 60 (FIG. 2), first end 15 is then inserted into a receiving aperture or slot defined by housing 60. Preferably, the length of the first end 15 corresponds to the desired insertion length of strand 11. Housing 60 can easily define several hundred receiving apertures. The proper aperture for each strand insertion is selected by software program instructions which control the placement of needle 20, the instructions defined by the program instructions created for each sign design. Once inserted, a calculated quantity (length) of strand 11 is fed through needle 20. Simultaneously, actuator 30 repositions needle 20 into a cutting station 70 as seen in FIGS. 3 and 6A through 6E. Cutting station 70 (FIG. 6A) carries a circular saw blade 72. A slot 22 defined by an outer wall of needle 20 permits the blade 72 to cut strand 11 at a location within needle 20. Preferably, blade 22 is retractable within a defined sleeve of cutting station 70 from a first extended cutting position (illustrated) to a second retracted position (not illustrated). As seen in reference to FIG. 6D, needle 20 is held in position against a curved stop provided by wall 74 of station 70. Once in position, blade 72 is extended, cutting the strand 11. Alternatively, as seen in FIG. 6A, blade 72 could be held in a fixed extended position while needle 20 is moved relative to the blade.

The circular sawing action has been found to impart a clean, optically finished surface to the cut ends of the fiber strands which helps ensure that the maximum transmission of light is received from the light source and is projected by the individually assembled fibers onto the display surface of a sign. The desired cut quality is ensured by providing a blade which rotates at a sufficient speed to perform both cutting and finishing actions.

Figure 3:
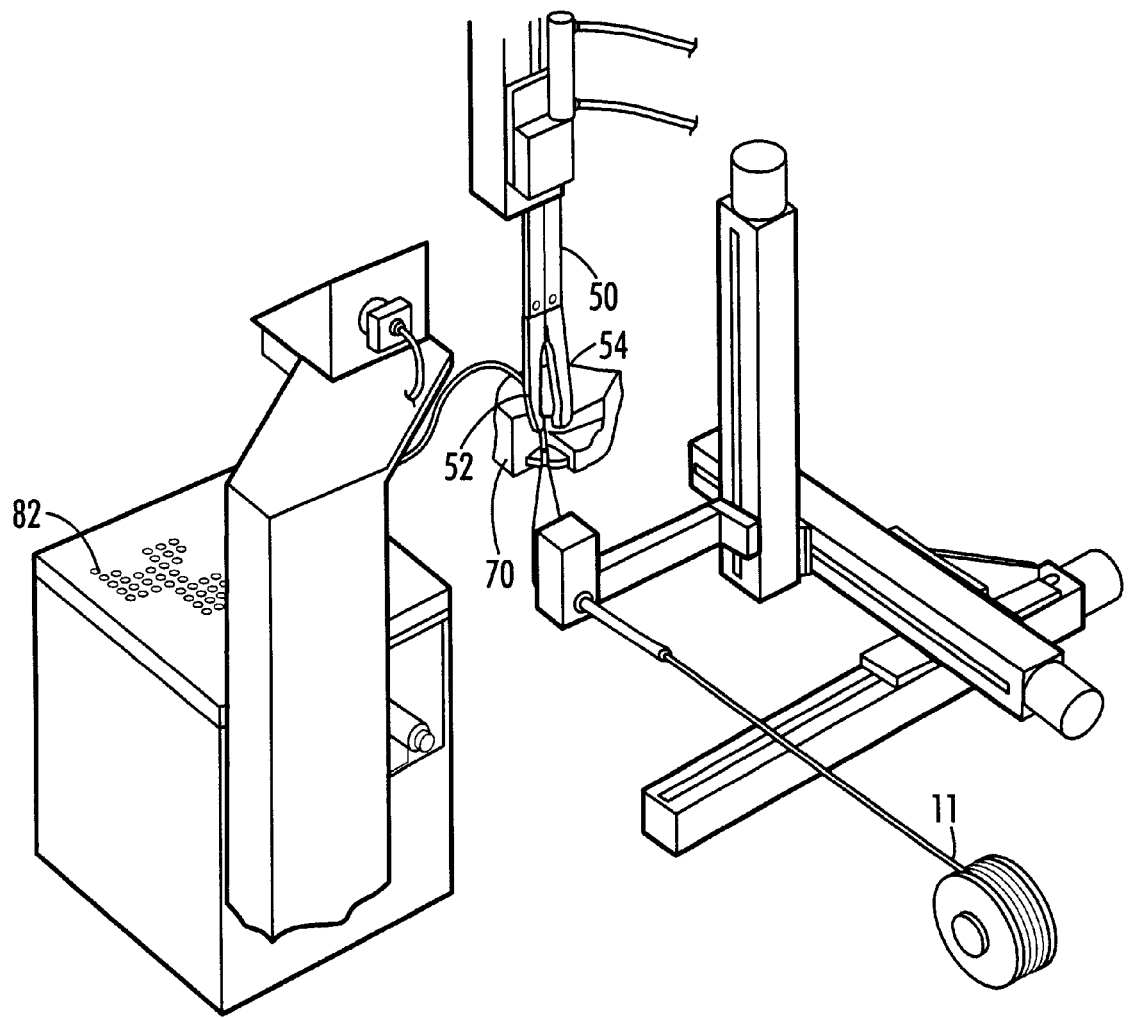
Figure 4:
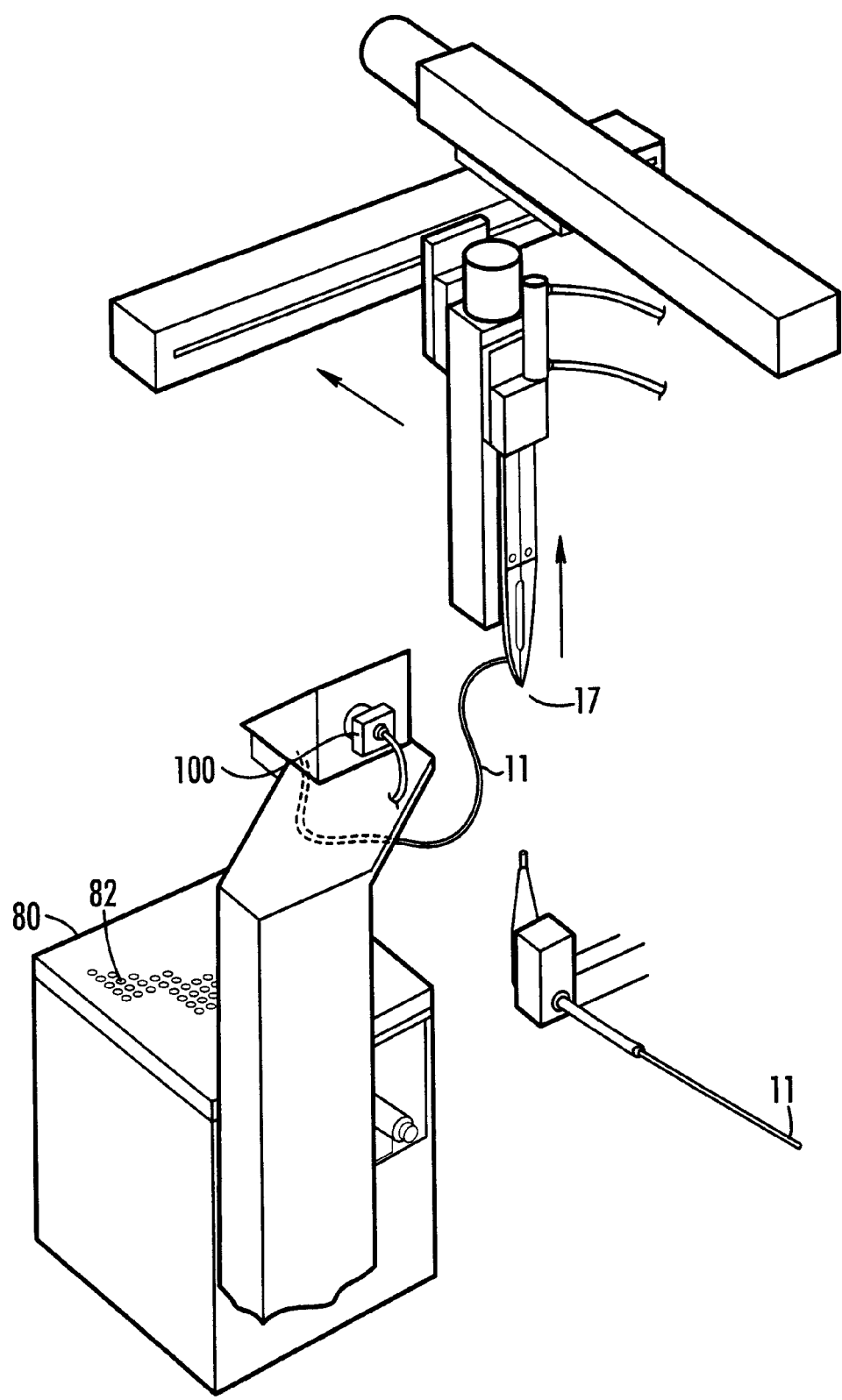

As seen in reference to FIGS. 3 through 5, once the strand 11 has been cut, gripper 50 is positioned opposite needle 20. Open jaws 52 and 54 are placed on opposite sides of the strand and, as described below, facilitate the engagement of the fiber strand at a point immediately opposite the tip of needle 20.

As seen in FIG. 9, the inner surface of gripper elements 52 and 54 define an interior channel or track 55. An inserter 51, having opposing jaw members 53 and 53', reside within the respective track portions 55 of gripper elements 52 and 54. Jaw members 53 and 53' are able to slide along a length portion of tracks 55 independent of the gripper jaw position. Further, the movement of the inserter 51 along tracks 55 provides the actual insertion force for placement of the strand end into the sign board.

Figure 10:
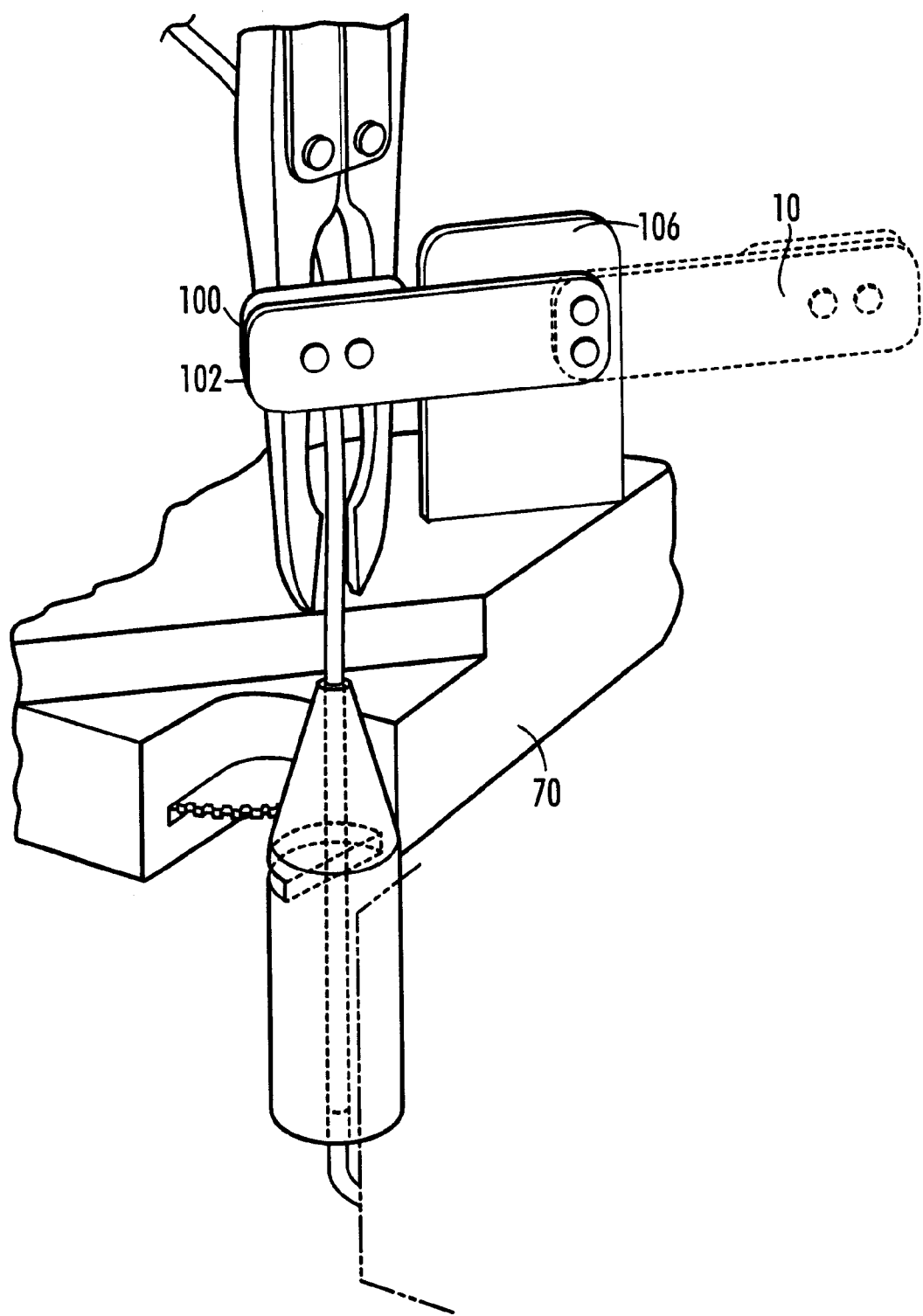
FIG. 10 is a perspective view of a front gripper seen in relation to a movable stop shown in both the 9 o'clock and 3 o'clock (normal) positions.
Figure 11:
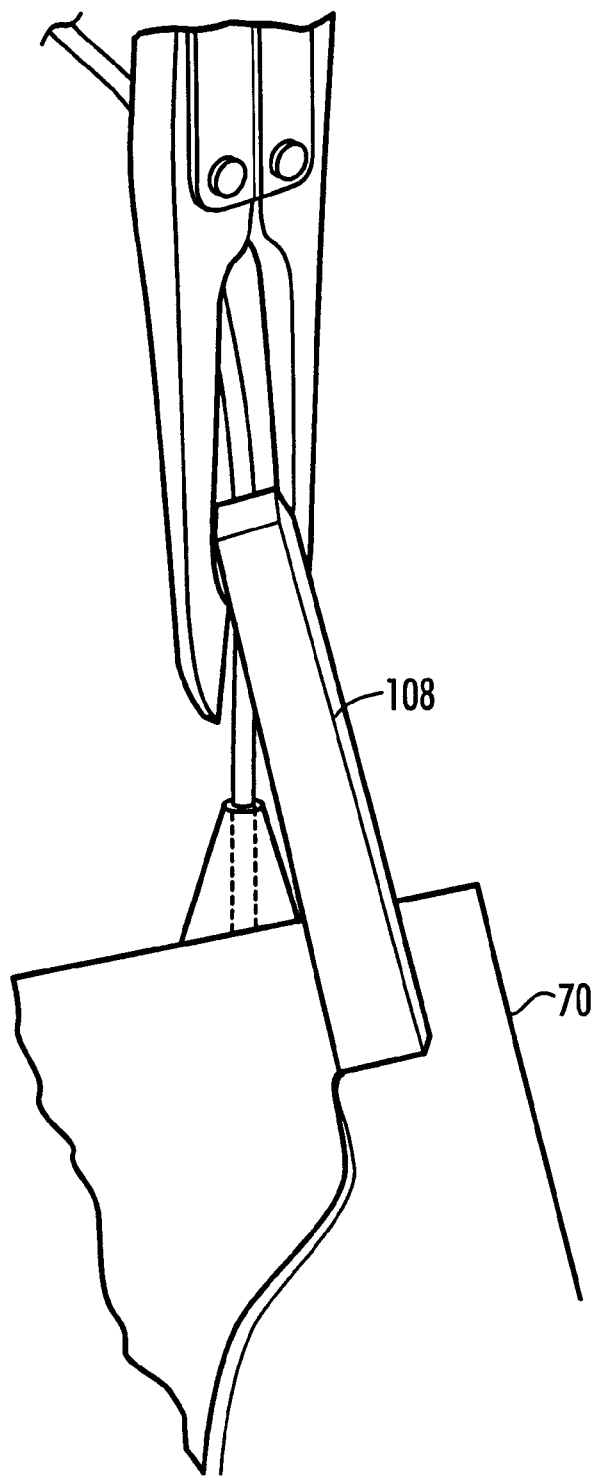
FIG. 11 is a perspective view of the rear stop seen in relation to the gripper.

With reference to FIG. 10, prior to jaw members 53 and 53' gripping strand 11, a movable stop 100 located adjacent to gripper 50 when the gripper is at the cutting station (70), rotates or pivots on device 106 from a normal 3 o'clock position to a 9 o'clock position contacting the front portion of the gripper 50. This contact by movable stop 100 positions strand 11 within the interior of the gripper 50 so that jaw members 53 and 53' (FIGS. 8 and 9) can grip the strand 11 properly. There is also a rear stop 108, as shown in FIG. 11, which is located at the back portion of the gripper 50. This rear stop 108 also maintains strand 11 within gripper 50 once strand 11 is positioned by the movable stop 100.

Following the cutting of the fiber, the inserter 51 retracts the second cut end 17 in a direction towards the interior of gripper 50 such that second cut end 17 is substantially flush with the tip of gripper 50, thus ensuring proper insertion length into panel board (80). As indicated by the directional arrows (FIG. 5), gripper 50 carries the individual strand 11 to an insertion position opposite a panel board 80. A second cut end 17 of the fiber optic strand, corresponding to the portion originally enclosed within needle 20 prior to strand 11 being cut, is carried by jaw members 53 and 53' within gripper elements 52 and 54. The second cut end is also described as an output end. As seen in reference to FIGS. 5 and 5A, pneumatically operated gripper 50 inserts second cut end 17 into a predefined hole 82 within a panel 80. The insertion depth of the cut end 17 into panel 80 is regulated by the operation of jaw members 53 and 53' within gripper 50, and the depth can be varied according to the desired effect for the constructed sign. To ensure a high degree of precision and uniformity, inserter 51, referenced in FIG. 9, provides movement within the interior of the gripper 50 necessary for the proper insertion depth of the second cut end 17 into board 80.

Just as the insertion point within housing 60 was selected for a single known aperture from a plurality of apertures, the corresponding insertion of the second cut end 17 of strand 11 into board 80 is similarly controlled. The software program instructions specify the precise location within board 80 for the second cut end 17 of fiber optic strand 11 to be inserted.

Board 80 is preferably constructed of an opaque substrate. A wide variety of materials can be used including, metal, wood, plastic, or foam. The board 80 preferably defines a plurality of predefined apertures such as drilled or punched holes which correspond to the desired insertion point of second cut end 17.

The software programming information used to control the insertion of the second cut end 17 can also be used as the basis for a pre-punched program in which gripper 50 uses a metal punch to create the pre-punch apertures 82 in the desired pattern and desired depth. In addition, the program can control a separate apparatus which is dedicated to the production of board 80. The program control can be integrated to a drill, laser, or punch used to define the apertures 82 within the substrate of board 80. While perpendicular apertures are most commonly used in reference to the display face of the panel surface of board 80, it is within the ability and scope of the present invention to utilize oblique apertures within board 80. Variations of aperture angle, combined with variations of insertion distance of a strand within or through the board, allow additional creative effects to be obtained while maintaining automated construction of the signage parts.

As seen in FIG. 5, a light box 90 is positioned below panel board 80. The light box 90 enables the optional step of verifying the proper insertion and position of each individual bundle relative to both the panel 80 and the input housing 60. As seen in reference to FIG. 1 and FIG. 4, a light detector 100 is in communication with the housing 60 for detecting the transmission of light from light box 90 through strand 11 and as transmitted through housing 60. The detection system can be used to verify that each inserted strand is in the proper position relative to board 80 as well as to input housing 60. Further, a threshold level for the intensity of the transmitted light can be used to detect when an individual strand has not been inserted or failed to be inserted a desired distance into board 80. When an erroneous or defective insertion is noted, the defective strand can be removed and the apparatus can repeat the prior insertion sequence.

While not illustrated, it has been found useful, and is generally known in the art, that plastic fiber optic strands are more pliable and have better handling characteristics and qualities when the strand is maintained at elevated temperatures. In a preferred embodiment, the fiber optic cable is maintained at an elevated temperature of approximately 150 degrees fahrenheit (150° F.). Therefore, it is useful to provide heating units for maintaining the spool 13 of fiber optic cable at an elevated temperature. Furthermore, the positioning of directional heaters (not shown) in proximity to housing 60 has been found to facilitate the insertion and retention of fiber optic strand first end 15. The application of heat relaxes the coiled "memory" resulting from the spooled storage of the fiber strand. The loss of memory facilitates the bundling and organization of the various lengths of strands.

As best seen in FIG. 1, once a plurality of strands has been inserted into panel 80 and housing 60, the collective bundle of fibers has considerable bulk. Accordingly, it is useful to have a tapered thin profile 58 (FIG. 8) to gripper 50 to facilitate the insertion of second cut end 17 to a location where adjacent apertures are already occupied by a strand. Similarly, insertion of strand end 15 by needle 20 results in a crowded operating field beneath housing 60 as the insertion process proceeds. Thus, it has also been found useful to provide a tapered tip shape 28 (FIG. 6A through 6D) to needle 20 to facilitate the insertion of ends 15 into housing 60. Further, needle 20 is preferably provided from a low friction, optically soft material such as acetyl, nylon, TEFLON™, polyethylene, or other polyolefin. A machined tapered tip so constructed, provides good lubrication and friction properties to minimize possible scratching of the exterior coating of the fiber optic strands. The tapered tip shape 28 of the needle 20 permits greater clearance distance between the needle and previously inserted strands during the insertion process.

It has also been found desirable to make use of the natural tendency of the fiber optic strand to curve. Since the source of the fiber optic strand comes from a spool 13 or a coiled supply, a memory persists in the individual cut fibers which is related to the twist of the strand on the coil. Thus, it has been found that, while additional strand is being fed through the tip of needle 20, a slight arcuate "looping" motion applied by actuator 30 to needle 20 will provide a natural curvature to the strand. The curvature facilitates the orderly bundling of the strands as second cut end 17 is moved into position onto block 80.

The above apparatus and process enables a fiber optic sign such as those identified in the referenced incorporated U.S. patents to be provided in a much more economical manner. Heretofore, hand assembly of a fiber optic signage with design parameters requiring coordinated positioning of the input and the output ends of the fibers could easily take 8 hours per sign. Use of the above apparatus and process enables the 8 hour fiber optic handling step to be reduced to less than an hour. As improvements and refinements are developed, additional time savings are envisioned.

That which is claimed:

1. An apparatus for assembling fiber optic strands into sign components comprising:

a dispenser in communication with a supply of fiber optic strand;

a first positioner for moving said dispenser to a dispensing position adapted to be opposite a receiving aperture of a housing;

engaging means in communication with said fiber optic strand for inserting a first end of said fiber optic strand through said dispenser and into one of said preselected housing apertures;

a cutting apparatus for cutting said fiber optic strand at a predetermined location, thereby providing a first length of cut strand having a first end insertable into one of said housing apertures and a second cut end;

a manipulator for grasping said second cut end of said cut strand;

a second positioner for moving said manipulator to a predetermined position opposite a signage display panel;

an inserter, carried by said manipulator, for directing said second cut end of said cut strand a prescribed depth into a display panel.

2. The apparatus according to claim 1 wherein said dispenser further comprises a hollow needle.

3. The apparatus according to claim 2 wherein said fiber optic strand is treated to maximize the reflection of light.

4. The apparatus according to claim 2 wherein said dispenser further comprises an optically soft material.

5. The apparatus according to claim 1 wherein said first positioner further comprises an actuator providing movement along an X, Y, and Z axis.

6. The apparatus according to claim 1 wherein said engaging means further comprises:

a first roller defining a grove on a surface of said first roller;

a plurality of tensioned rollers, each roller engaging an edge portion of said fiber optic strand housed within said grove of said first roller, said tensioned roller responsive to a drive means.

7. The apparatus according to claim 1 wherein said manipulator further comprises:

a gripper, said gripper carrying said inserter by means positionable along an interior length of said gripper.

8. The apparatus according to claim 7 wherein said inserter is positionable along an interior length of said gripper.

9. The apparatus according to claim 7 wherein said gripper provides an internal guide for facilitating movement of the inserter along said guide.

10. The apparatus according to claim 1 wherein said cutting apparatus comprises a rotary blade.

11. The apparatus according to claim 1 wherein said dispenser further defines a passage having an inner diameter substantially identical to the diameter of said fiber optic strand, said passage and said fiber optic strand within said passage in further communication with a lateral opening of said dispenser, the opening in selective communication with a blade of said cutting apparatus.

12. A process of placing a plurality of fiber optic strands into components of a sign, each individual strand having an input end and an output end, and each input end and output end further having a predetermined and unique placement position, comprising:

providing a single strand of fiber optic strand to a dispenser;

placing said dispenser adjacent an input housing, said housing defining a plurality of receiving apertures;

inserting a free end of said strand into a preselected receiving aperture, said free end inserted into said aperture further defining an input end of said strand;

feeding a calculated length of said strand through said dispenser;

moving said dispenser to a strand cutting station;

cutting said strand, thereby providing a first strand having a known length and an output end, said first strand having had said input end inserted into said input housing in the immediate prior inserting step, said cutting step further providing a new strand of fiber within said dispenser;

placing said output end of said first known length of strand opposite a predetermined position of a display panel;

inserting said output end a prescribed depth within said display panel;

repositioning said dispenser adjacent said input housing; and, repeating the above steps.

13. The process according to claim 12 wherein said cutting step further comprises:

supporting said strand within an aperture defined by a housing, said aperture having a cross-sectional area slightly greater than a cross-sectional area of said fiber optic strand;

providing a slit through a portion of said housing, said slit providing communication between said housing aperture and an exterior of said housing;

inserting a rotating circular blade into said slit;

cutting said strand with said blade, said strand now having two cut ends adjacent the blade; and, optically finishing the two cut ends by the passage of an edge of said rotating circular blade against a respective cut end of said strand.

14. The process according to claim 13, wherein said method of providing a fiber optic strand further comprises providing a fiber optic strand made of polymethyl methacrylate.

15. The process according to claim 13, wherein said step of inserting a rotating blade further comprises inserting a rotating blade having a thickness of approximately 0.01 inches.

16. The process according to claim 13 wherein said step of providing a slit further comprises cutting said slit with said rotating saw blade.

17. The process according to claim 12 comprising the additional step of:

maintaining said input housing at an elevated temperature as said fiber optic strands are inserted into said housing.

18. The process according to claim 12 comprising the additional step of:

heating a supply of a fiber optic strand.

19. The process according to claim 12 comprising the additional steps of:

exposing the output end of the fiber optic strand to a source of light;

transmitting light from said source along the length of said strand to said input end;

measuring the intensity of said transmitted light from said input end, thereby verifying a correct installed position for each fiber.

20. The process according to claim 19 comprising the additional step of removing said fiber optic strand from said sign components when said measurement of transmitted light is indicative of a fault condition.

* * * * *